June 9, 1953 — W. W. MAHER — 2,641,126
CAN TESTING HEAD ADAPTABLE TO VARIOUS SIZES OF CANS
Filed Dec. 2, 1947 — 3 Sheets-Sheet 1
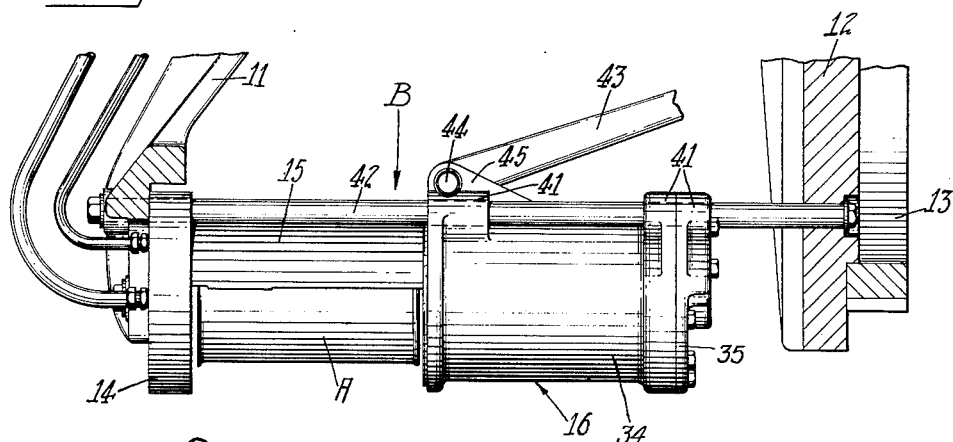
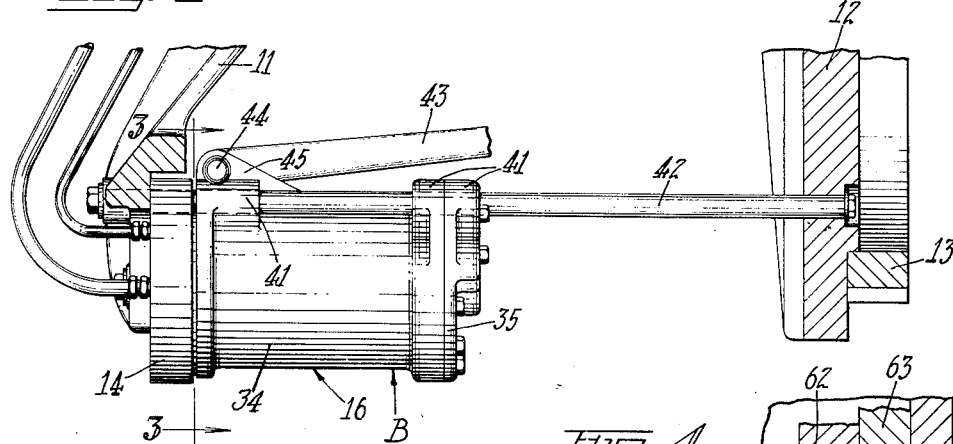
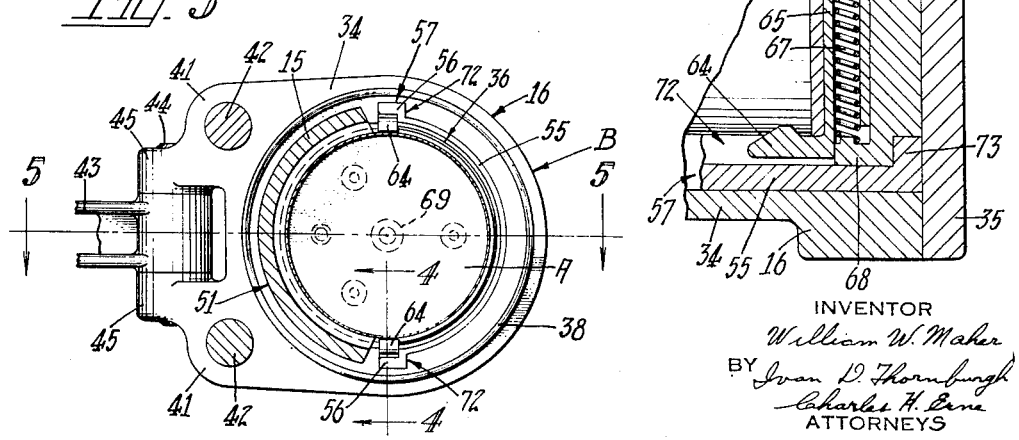
INVENTOR
William W. Maher
BY Ivan D. Thornburgh
Charles H. Cene
ATTORNEYS June 9, 1953   W. W. MAHER   2,641,126
CAN TESTING HEAD ADAPTABLE TO VARIOUS SIZES OF CANS
Filed Dec. 2, 1947   3 Sheets-Sheet 2
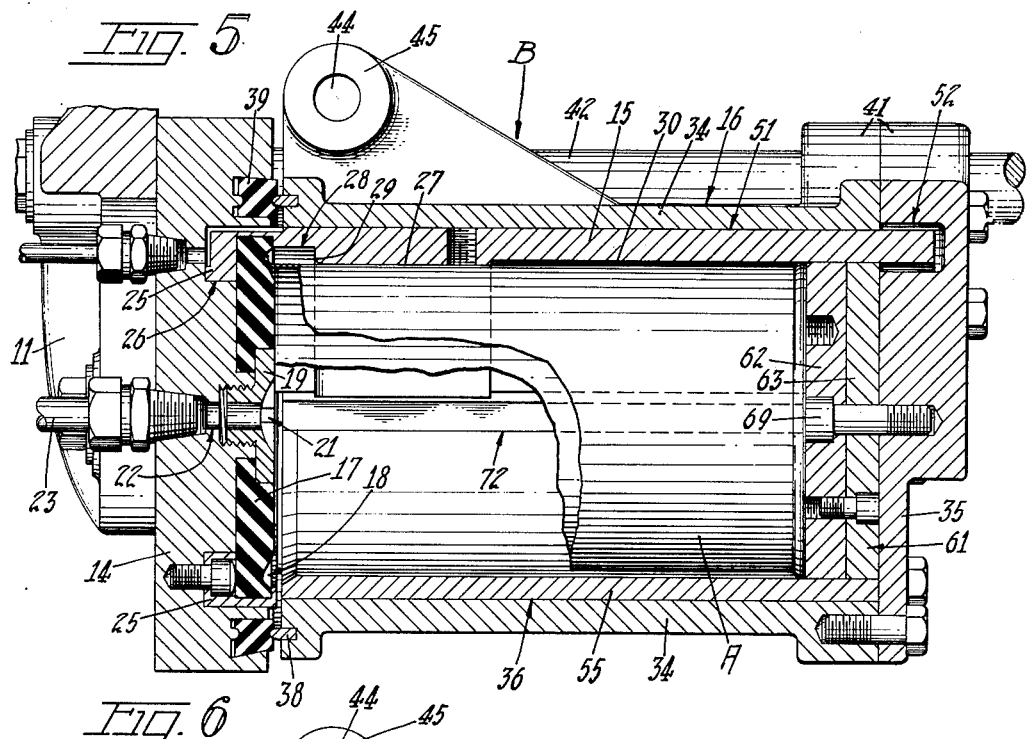
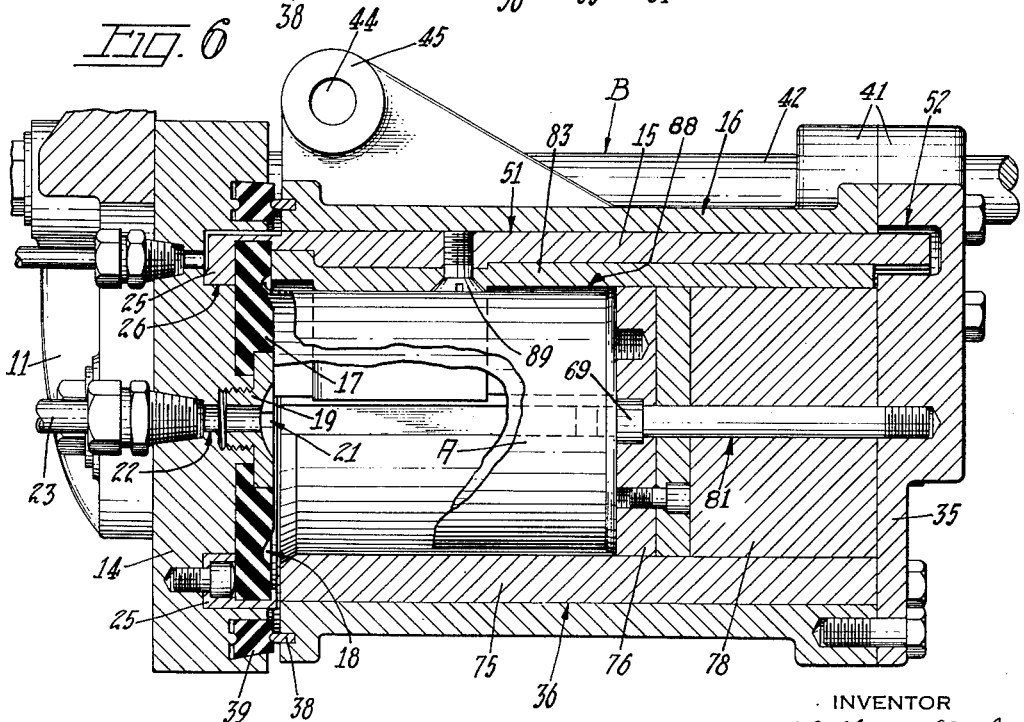
INVENTOR
William W. Maher
BY Ivan D. Thornburgh
Charles H. Ines
ATTORNEYS June 9, 1953　　　W. W. MAHER　　　2,641,126
CAN TESTING HEAD ADAPTABLE TO VARIOUS SIZES OF CANS
Filed Dec. 2, 1947　　　3 Sheets-Sheet 3
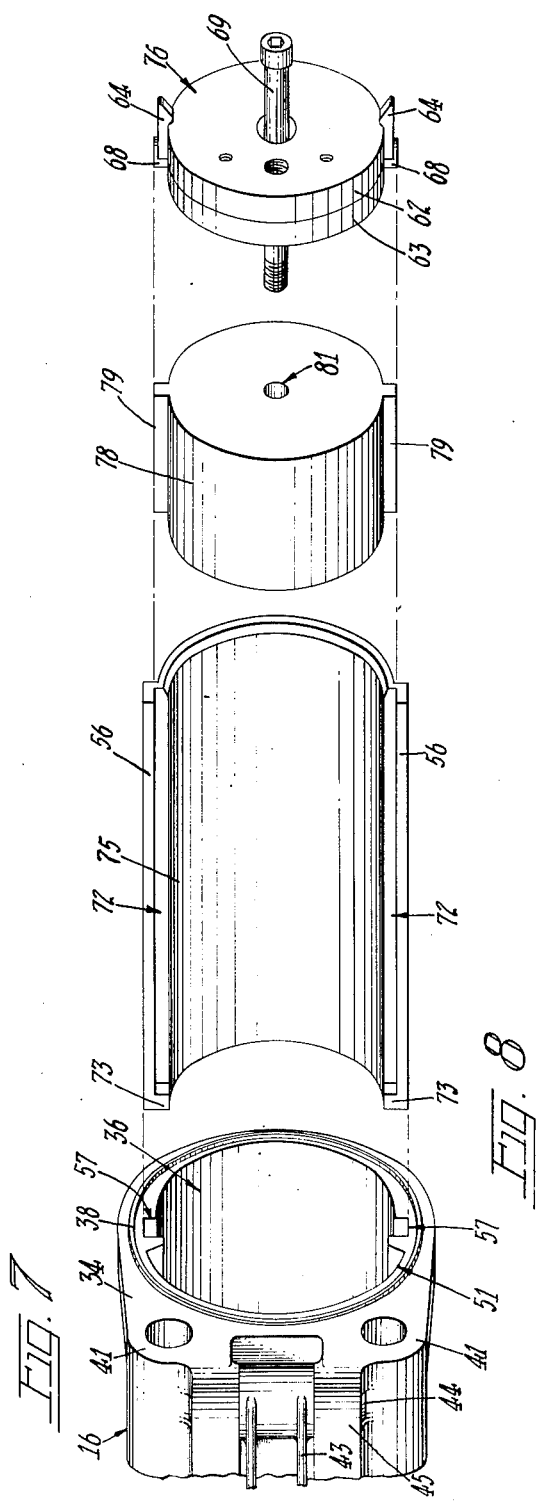
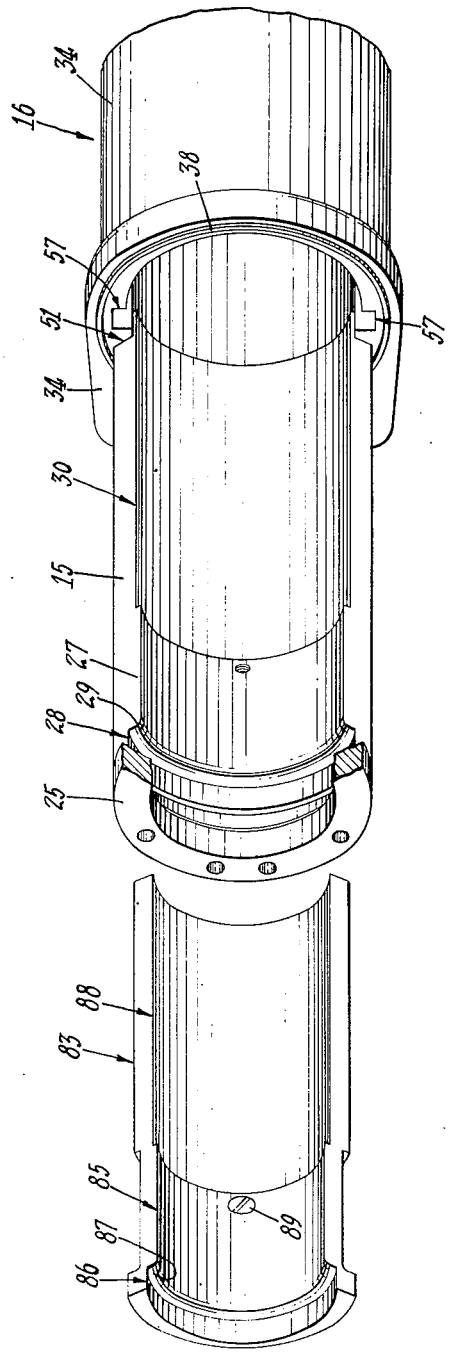
INVENTOR
William W. Maher
BY Ivan D. Thornburgh
Charles H. Ernr
ATTORNEYS Patented June 9, 1953

UNITED STATES PATENT OFFICE 2,641,126

CAN TESTING HEAD ADAPTABLE TO VARIOUS SIZES OF CANS

William W. Maher, San Francisco, Calif., assignor to American Can Company, New York, N. Y., a corporation of New Jersey Application December 2, 1947, Serial No. 789,287

8 Claims. (Cl. 73—42)

The present invention relates to container or can testing machines in which the cans are subjected to air under pressure to detect those which leak and has particular reference to an improved can testing head which is adaptable to different sizes of cans to be tested.

The usual testing machine utilized for testing cans for leaks by applying air pressure to the cans comprises a rotatable wheel having as many as sixty or more separate testing heads for receiving and testing individual cans passing through the machine in a substantially continuous procession. Such a machine is highly automatic. The testing heads of such a machine have heretofore been designed to operate on only one size of can. When a different size of can is desired to be tested in the machine, all the testing heads have to be removed and replaced by others of a proper size. This involves considerable time and labor, sometimes requiring the labor of two men for upwards of a half a day or more.

The instant invention contemplates overcoming this difficulty by the provision of a permanent testing head which may be readily adapted or changed to different sizes of cans.

An object of the invention is the provision in a can testing machine of permanent testing heads wherein the internal chamber capacity of the heads may be rapidly and easily altered to accommodate a variety of cans of different diameters and heights so that the machine may be quickly changed over with a minimum of time and effort from one can size to another as required.

Another object is the provision of such testing heads wherein the change parts are interchangeable, exchangeable or substitutable and useable in various combinations so that the chamber capacity of the heads may be readily changed to accommodate a can of a particular diameter and height with a minimum of change parts.

Another object is the provision of such testing heads wherein any selected combination of change parts may be interlocked and inserted into a testing head as a single unit and secured in place with a single screw.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a can testing head embodying the instant invention, the head being shown in an open position with a can as received in place prior to testing, with portions of the head supports being shown in section and with parts broken away;

Fig. 2 is a view similar to Fig. 1 with the testing head in a closed position confining the can for testing;

Fig. 3 is an enlarged sectional view taken substantially along the line 3—3 in Fig. 2, with parts broken away;

Fig. 4 is an enlarged sectional detail taken substantially along the line 4—4 in Fig. 3, with parts broken away;

Figs. 5 and 6 are enlarged sectional views taken substantially along the line 5—5 in Fig. 3, and showing the embodiment of change parts of different sizes for the accommodation of cans of different sizes; and Figs. 7 and 8 are perspective exploded views of a portion of a testing head and a combination of change parts for altering the capacity of the head chamber to a particular size of can.

As a preferred embodiment of the instant invention the drawings illustrate principal testing head parts of a can testing machine of the type disclosed in my United States Patent 2,232,711, issued February 25, 1941, on Can Testing Apparatus. In such a machine sheet metal cans A having one end open are subjected to air under pressure and if found to leak are discharged from the machine by way of a leaky can outlet, while good cans, i. e. cans which do not leak, are discharged from the machine by way of a good can outlet.

Testing of a can is effected in a sealing and testing head B. There are a plurality of these heads arranged in a circle around a pair of spaced and parallel rotatable support wheels 11, 12 (Figs. 1 and 2) which are continuously rotated by a gear 13 secured to the wheel 12. The wheels may be horizontal as in my patent above mentioned or may be vertical as disclosed in United States Patent 2,019,517, issued November 5, 1935, to M. E. Widell, on Can Testing Machine.

Each testing head B includes a fixed sealing pad 14, a can retaining cradle 15, and a movable housing 16 adapted to telescope over the cradle and a can therein for confining the can for the testing operation. The sealing pad is bolted to the support wheel 11 and carries a resilient sealing ring 17, preferably made of rubber or the like material, against which the open end of the can to be tested is clamped during the testing operation. This sealing ring 17 on its inner face adjacent its outer periphery is formed with an annular recess or groove 18 for the reception of the flange of the can to insure a hermetic fit between the can and the ring. The sealing pad also carries an insert 19 having an orifice 21 through which compressed air is introduced into the interior of the can. This orifice communicates with a channel 22 in the sealing pad and the channel communicates with a tube 23 which leads from any suitable source of compressed air.

The cradle 15 is semicylindrical in cross-section and constitutes a half pocket, referred to in can manufacturing parlance as a can tester mould for supporting a can A in a horizontal position disposed at right angles to the sealing pad 14 and in axial alignment therewith. For this purpose the cradle extends laterally from the inner face of the sealing pad and is held in place by a ring 25 (Figs. 5 and 6) which is integral with the cradle. The ring is disposed in an annular groove 26 in the pad and is bolted to the pad.

The inner surface of the cradle 15 is formed with a curved wall section 27 which engages and partially surrounds the body of a can A adjacent its flange. Adjacent the sealing pad 14, the inner surface of the cradle is relieved to form a clearance groove 28 for the flange of the can and to provide a flange stop or shoulder 29 for use in locating the can for discharge after a testing operation. Beyond the body support wall section 27, the inner surface of the cradle is enlarged or cut away to form a curved seam support wall section 30 for supporting engagement with the end seam of the can.

The movable housing 16 comprises a cylindrical tubular shell 34 having an end member 35 bolted to the outer end thereof and thus encloses a testing chamber 36 having its inner end open for surrounding the cradle 15 and a can A therein in telescoping relation. Adjacent its open end, the housing shell 34 carries a rigid sealing ring 38 for hermetic sealing engagement with a resilient sealing ring 39, made of rubber or the like material, disposed in an annular recess formed in the inner face of the sealing pad.

The housing 16 is mounted in alignment with the longitudinal axis of the can cradle 15 and is movable along this axis toward and away from the sealing pad 14. For this purpose the housing shell 34 and its end member 35 are formed with pairs of spaced slide bearings 41 (Figs. 1, 2 and 3) which surround a pair of stationary spaced and parallel slide bars 42 disposed in parallelism with the axis of the can cradle 15. The ends of the bars are secured in the support wheels 11, 12. Reciprocal movement of the housing along the bars is effected in any suitable manner in time with the other moving parts of the machine, by a link 43, one end of which is mounted on a pivot pin 44 carried in a pair of spaced lugs 45 which extend out from the housing.

A can A to be tested is seated in its cradle 15 with its open flanged end adjacent the sealing pad 14, when the housing 16 is separated from and in spaced relation to the sealing pad as best shown in Fig. 1. With the can in its cradle, the housing is moved forward, toward the left as viewed in Fig. 1 and telescopes over the can and its cradle, and makes sealing contact between its rigid sealing ring 38 and the resilient sealing ring 39 in the sealing pad and thus hermetically confines the can for the testing operation, as best shown in Figs. 2, 5 and 6.

During movement of the housing 16 toward and away from the sealing pad 14, the cradle 15 slides in a wide arcuate clearance groove 51 (Figs. 3, 7 and 8) which is formed in the inner surface of the housing and which extends around this surface for nearly one half of the inside diameter of the housing shell. When the housing is in engagement with the sealing pad 14, the inner end of the cradle projects into a continuing enlarged clearance recess 52 formed in the housing end member 35 (see Figs. 5 and 6).

While in the testing chamber 36 of the housing 16, a can A to be tested is supported by the cradle 15 and by a cooperating half-round removable can support spacer or filler block 55 (see Figs. 3 and 5) which fits within the housing. The outer surface of this block is curved to fit the inside radial surface of the housing shell 34. Its inner surface is curved to fit the diametrical dimension of the end seam of the can to be tested. Adjacent its longitudinal edges the support block is formed with a pair of diametrically opposed tongues 56 which when the support block is in place in the housing fit into a pair of longitudinal and diametrically opposed tongue receiving grooves 57 formed in the inner surface of the housing shell 34 adjacent the terminal longitudinal edges of the wide cradle groove 51 (best shown in Fig. 3).

The can support block 55 when in the housing is held against endwise displacement by a clamp block or head 61 (Fig. 5) which is disposed in the closed end of the chamber 36 and which is used for clamping the can to be tested. The can is held against the sealing pad 14 for the testing operation. This clamp block 61 comprises a pair of discs 62, 63 which are bolted together and which between them carry a pair of diametrically opposed gripper or snap fingers or hook shaped latches 64 (see Figs. 3 and 4). These fingers extend beyond the outer periphery of the disc 62 and engage over the end seam of the can to be tested when the housing 16 telescopes over it, for pulling the can away from the sealing pad 14 and sealing ring 17 when the housing moves away from the pad after the testing operation. The stop shoulder 29 on the cradle 15 is engaged by the end flange of the can during this travel of the housing and strips the can away from the grip of the fingers 64 to free the can for discharge from the machine when the housing is clear of the can.

The gripper fingers 64 (Fig. 4) are formed with laterally extending shanks 65 which slide in grooves 66 formed in the disc 62. Compression springs 67 located within the shanks press the fingers toward each other for gripping the can between them. The outer ends of the springs 67 engage against stop or locking lugs 68 which are formed on the disc 63. There are two of these lugs 68 disposed in diametrically opposed positions on the disc 63 and they extend beyond the outer periphery of the disc.

In the housing assembly, the can support block 55 and the clamp block 61 are interlocked as a unit and are held in place in the housing shell 34 by a single screw 69 (Fig. 5) for quick and easy assembly with and removal from the housing. For this purpose the block 55 is provided with longitudinal grooves 72 (Figs. 3 and 4) which are formed in the tongues 56 of the support block and which stop short of its inner end to form arcuate end shoulders 73.

In this assembly, the clamp block 61 fits within the support block 55 adjacent its inner end, with the stop lugs 68 of the disc 63 extending into the groove 72 of the support block and in engagement with the support block shoulders 73 as best shown in Fig. 4. The locking screw 69 extends through the clamp block 61 and is threadedly engaged in the end member 35 of the housing 16. Thus the housing 16, the support block 55 and the clamp block 61 are locked together and move as a unit.

When it is desired to change the machine over for testing a different size of can, it is merely necessary to loosen the one screw 69 and withdraw the can support block 55 and the clamp block 61 as a unit and replace them with a support block having a different internal diameter and a different size of clamp block to fit this new can size. By way of example, Figs. 6, 7 and 8 of the drawings illustrate a can support block 75 and a clamp block 76 for a can of much smaller diameter and height than the one shown in Fig. 5. The support block 75 is formed with tongues 56, grooves 72 and shoulders 73 as in the support block already described. The clamp block 76 may also consist of a pair of discs. These will be smaller in diameter than the discs of Fig. 5 but may be of the same thickness.

For a can height such as in the above example in Fig. 6, a spacer block 78 (Fig. 7) is interposed between the end member 35 of the housing 16 and the clamp block 76. This spacer block is cylindrical and of a diameter to fit the inside of the support block it is to be used with. The spacer block 78 is formed with a pair of diametrically opposed tongues 79 which fit into corresponding grooves 72 of the new or substituted support blocks 75, which tongues engage against the end shoulders 73 of the support block. The spacer block 78 is provided with a clearance hole 81 for the screw 69. Hence the can support block 75, the clamp block 76 and the spacer block 78 are all interlocked and assembled as a unit and secured in place in the housing 16 by the single screw 69 when a can A of different diameter and different height is to be accommodated. In this case a longer screw 69 is required than when no spacer block is used.

Further explanation may be made of the perspective views of Figs. 7 and 8. Fig. 8 is shown in reverse of Fig. 7 and the other longitudinal figures. The two Figures 7 and 8 taken together indicate all of the separate parts to complete the assembly corresponding to Fig. 6 and in addition show both sides of the tubular shell 34. This more clearly indicates the details and relationship of the parts constituting the assembly.

For such a different size of can A an auxiliary cradle 83 (Figs. 6 and 8) is used in connection with the main cradle 15 to properly support the can during the test. This auxiliary cradle 83 is similar in construction to the main cradle in that it is semicylindrical in cross-section and of a length sufficient to fit into the housing 16 without endwise interference therewith. The outer surface of the auxiliary cradle is formed in peripherally stepped fashion to interlock with the wall sections 27, 30 and groove 28 and shoulder 29 of the main cradle 15. The inner surface of the auxiliary cradle is formed with a can body support wall section 85, a can end flange clearance groove 86, a can end flange stop or shoulder 87, and a can end seam support wall section 88 to correspond with these same wall sections, groove, and shoulder in the main cradle. In use, the auxiliary cradle 83 fits within the main cradle 15 as best shown in Fig. 6 and is secured in place by a removable screw 89 which extends through the auxiliary cradle and is threadedly engaged in the main cradle.

With such a construction of testing head, and different sizes of auxiliary cradles 83, can support blocks 55 and 75, clamp blocks 61, 76 and spacer blocks 78 to correspond to the various different sizes of cans within a predetermined range, the testing heads of the machine may be rapidly and easily changed over by mere substitution of change parts involving the manipulation of only two screws in each head and thereby eliminates costly and time consuming partial disassembly of major portions of the machine as hereinbefore experienced.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for testing for leaks containers having open ends, the combination of a container testing head including a tubular housing for enclosing a container for testing, said housing having a longitudinal clearance groove and longitudinal tongue grooves disposed on the inside, a cradle movable in the clearance groove of said housing for receiving and supporting a container, a sealing pad disposed adjacent said cradle and engageable with the open end of the container for sealing it for the test, a can support block having tongues for fitting within the tongue grooves of said housing to position said block for cooperative support of the container under test, a clamping head having locking attachment with the inside end wall of said housing for engaging the closed end of the container, said clamping head having means for holding said can support block in can supporting position within said housing, and means for moving said housing with the enclosed supported container backed up by said clamping head to press the open end of the container against said sealing pad into sealed testing position.

2. In a machine for testing for leaks containers having open ends, the combination of a container testing head including a tubular housing for enclosing a container for testing, said housing having a longitudinal clearance groove and longitudinal tongue grooves disposed on the inside thereof, a sealing pad disposed adjacent said housing and engageable with the open end of the container within the housing for sealing the container for the test, a main cradle carried by said sealing pad and slidable in the clearance groove of said housing, an auxiliary cradle carried on the inside of said main cradle for supporting a container for the test, a can support block having tongues for fitting within the tongue grooves of said housing to position said block for cooperative support of the container under test, said can support block also having longitudinal tongue grooves, a spacer block having tongues for fitting within the tongue grooves of said can support block, a clamping head having locking engagement with the inside end wall of said housing, said clamping head having means for holding said can support block and said spacer block in said housing to locate said can support block in container supporting position within said housing, and means for moving said housing with the enclosed and supported container backed up by said clamping head to press the open end of the container against said sealing pad into sealed testing position.

3. A machine for testing open ended containers for leaks, comprising a testing head including a substantially semi-cylindrical cradle for receiving and supporting a container to be tested, means on said cradle for sealing the open end of the supported container, a cylindrical housing movable into telescoping sealed relation with said cradle for completely enclosing the latter and said container in sealed relation with said sealing means, and a substantially semi-cylindrical support block removably mounted within said housing in opposed relation to said cradle, the inner wall surface of said support block cooperating with the inner wall surface of said cradle to peripherally engage and exteriorly support the peripheral portion of said enclosed container projecting from said cradle.

4. A machine for testing open ended containers for leaks, comprising a testing head including a substantially semi-cylindrical cradle for receiving and supporting a container to be tested, a sealing pad on said cradle for sealing the open end of the supported container, a cylindrical housing movable into external telescoping sealed relation with said cradle for completely enclosing the latter and said container in sealed relation to its said sealing means, and a substantially semi-cylindrical support block having a longitudinally extending tongue thereon removably mounted within said housing opposite to said cradle and cooperating with the cradle to peripherally engage and exteriorly support the enclosed container to be tested, said cylindrical housing having a longitudinally extending groove on its inner wall surface for the reception therein of the aforesaid longitudinal tongue on said support block to maintain the latter in container engaging position and against axial rotation within and relative to said housing.

5. A machine for testing open ended containers of varying sizes for leaks, comprising a testing head including a substantially semi-cylindrical cradle for receiving and supporting a container of maximum size to be tested, means on said cradle for sealing the open end of the supported container, a cylindrical housing movable into telescoping sealed relation with said cradle for completely enclosing the latter and said container in sealed relation to said sealing means, a substantially semi-cylindrical support block removably mounted within said housing in opposed relation to said cradle, the inner wall surface of said support block cooperating with the inner wall surface of said cradle to peripherally engage and exteriorly support the peripheral portion of said enclosed container projecting from said cradle, and retaining means on the inner wall surfaces of said cradle and said housing respectively for removably receiving therein in opposed can engaging relation an insertable auxiliary semi-cylindrical cradle and an alternate insertable semi-cylindrical support block of smaller complementary can engaging dimensions, to cooperatively jointly support and enclose for testing a can of less diameter when said auxiliary cradle and smaller support block are inserted within said first mentioned cradle and housing respectively.

6. A machine for testing open ended containers of varying sizes for leaks, comprising a testing head including a substantially semi-cylindrical cradle for receiving and supporting a container of maximum size to be tested, means on said cradle for sealing the open end of the supported container, a cylindrical housing movable into telescoping sealed relation with said cradle for completely enclosing the latter and said container in sealed relation to said sealing means, a substantially semi-cylindrical support block having a longitudinally extending tongue thereon removably mounted within said housing in opposed relation to said cradle, the inner wall surface of said support block cooperating with the inner wall surface of said cradle to peripherally engage and exteriorly support the peripheral portion of said enclosed container projecting from said cradle, means on said cradle for removably securing thereto in opposed can engaging relation an insertable auxiliary semi-cylindrical cradle of smaller can engaging dimensions when the latter is inserted into said cradle, and a longitudinally extending groove on the inner wall surface of said cylindrical housing for the reception therein of the aforesaid longitudinal tongue on an alternate semi-cylindrical support block of complementary smaller container engaging dimensions when the latter is inserted into said housing, whereby said smaller container may be alternately supported by said auxiliary cradle and said different support block for a test within said enclosing housing of the testing head.

7. A machine for testing open ended containers of varying size for leaks, comprising a testing head including a substantially semi-cylindrical cradle for receiving and supporting a container to be tested, means on said cradle for sealing the open end of the supported container, a cylindrical open ended housing movable into telescoping sealed relation with said cradle for completely enclosing the latter and said container in sealed relation with said sealing means, a substantially semi-cylindrical support block removably mounted within said housing in opposed relation to said cradle and cooperating with the cradle to peripherally engage the side walls of and exteriorly support the enclosed container, and a clamp block disposed within and adjacent a closed end of said housing for engaging against the adjacent closed end of a sealed container to be tested within said housing, said clamp block being apertured for the reception therethrough of means to removably secure the block to the closed end wall of said housing, said clamp block having latch means thereon for engaging the container end seam to pull the container from engagement with its said sealing means upon separation of said cradle and housing after the testing operation, said apertured clamp block being adapted to clamp between its inner wall surface and said housing end wall by said securing means an apertured spacer block of predetermined dimensions to enclose and seal a container of less height within said housing when the latter is telescoped over said cradle.

8. A container testing mechanism as defined in claim 4, wherein said cradle is provided with means thereon for receiving and supporting an inserted auxiliary semi-cylindrical cradle of smaller size, and said longitudinally extending groove on said cylindrical housing is adapted to receive a corresponding longitudinally extending tongue on a semi-cylindrical support block of smaller size, for similarly cooperatively enclosing and supporting for alternately testing the peripheral wall surface of a container of less diameter.

WILLIAM W. MAHER.

References Cited in the file of this patent

UNITED STATES PATENTS

| Number | Name | Date |
|---|---|---|
| 1,118,478 | Dixon | Nov. 24, 1914 |
| 1,270,922 | Brenzinger | July 2, 1918 |
| 1,845,362 | Tevander | Feb. 16, 1932 |
| 2,336,073 | Eckstein et al. | Dec. 7, 1943 |
| 2,527,560 | Maher | Oct. 31, 1950 |